United States Patent
Chu et al.

[11] Patent Number: 5,637,784
[45] Date of Patent: Jun. 10, 1997

[54] HYDROCARBON DISTILLATE FUELS CONTAINING NOVEL ADDITIVE

[75] Inventors: Alice S. Chu, Spotswood; Andrew Jackson, Pennington; Margaret M. Wu, Skillman, all of N.J.

[73] Assignee: Mobil Oil Corporation, Fairfax, Va.

[21] Appl. No.: 536,724

[22] Filed: Sep. 28, 1995

Related U.S. Application Data

[62] Division of Ser. No. 178,152, Jan. 6, 1994, Pat. No. 5,488,191.

[51] Int. Cl.$^6$ .................................................. C10L 1/16
[52] U.S. Cl. ................................. 585/14; 585/530
[58] Field of Search .............................. 585/14, 530

[56] References Cited

U.S. PATENT DOCUMENTS

| | | | |
|---|---|---|---|
| 4,827,023 | 5/1989 | Hsu | 560/204 |
| 4,827,064 | 5/1989 | Wu | 585/10 |
| 5,146,021 | 9/1992 | Jackson et al. | 585/10 |
| 5,157,177 | 10/1992 | Pelrine et al. | 585/530 |
| 5,243,114 | 9/1993 | Johnson et al. | 585/530 |
| 5,264,642 | 11/1993 | Wu | 585/530 |

*Primary Examiner*—Jacqueline V. Howard
*Attorney, Agent, or Firm*—Malcolm D. Keen

[57] ABSTRACT

A hydrocarbon oligomer and a process for its production is disclosed that is useful as a pour point depressant and as a combination pour point depressant and viscosity index improver for mineral oil or synthetic oil. The oligomer is also useful in modifying wax crystal formation at low temperature when added to distillate fuels. The oligomer is a near linear copolymer of a mixture of ethylene and $C_3$–$C_{28}$ 1-alkenes, or only 1-alkenes, wherein a large proportion of the pendant alkyl groups of the recurring 1-alkene monomer units contain between 14 and 22 carbon atoms. The oligomer is produced by polymerization of mixed 1-alkenes with reduced chromium oxide catalyst on silica support.

16 Claims, 5 Drawing Sheets

FIG. 5

MIXED HVI-PAO FEED COMPOSITION

HYDROCARBON DISTILLATE FUELS CONTAINING NOVEL ADDITIVE

This is a division of application Ser. No. 08/178,152, filed on Jan. 6, 1994, now U.S. Pat. No. 5,488,191.

This invention relates to novel additives for hydrocarbon lubricants and distillate fuels and to the process for their production. The invention particularly relates to novel hydrocarbon additives useful as pour point depressants and additives which show combined pour point depressant and viscosity index improving properties for hydrocarbon lubricants and inhibitors of waxy particle formation in diesel fuel at low temperatures. The novel additives are produced by reduced chromium oxide catalyzed polymerization of mixed 1-alkenes rich in $C_{18}+$ 1-alkenes.

BACKGROUND OF THE INVENTION

The formulation of synthetic or mineral oil based lubricants typically includes an additive package incorporating a variety of chemicals to improve or protect lubricant properties in application specific situations, particularly internal combustion engine and machinery applications. The more commonly used additives include oxidation inhibitors, rust inhibitors, antiwear agents, pour point depressants, detergent-dispersants, viscosity index (VI) improvers, foam inhibitors and the like. This aspect of the lubricant arts is specifically described in Kirk-Othmer "Encyclopedia of Chemical Technology", 3rd edition, Vol. 14, pp 477–526, incorporated herein by reference. The inclusion of additives in hydrocarbon lubricants provides a continuing challenge to workers in the field to develop improved additives of increased compatibility with the lubricant. Superior additives, while contributing their inherent attribute to the formulation, must do so while maintaining or improving upon the composite thermal and oxidative stability of the lubricant formulation.

The low temperature flow characteristic of hydrocarbon lubricants are typically improved by adding pour point depressants (PPD) to the formulation. At low temperatures, these additives modify the shape and size of the precipitating waxy hydrocarbon crystal to slow agglomeration and lower the effective pour point temperature of the lubricant formulation. Currently, preferred pour point depressants include polymethacrylates and ethylene-vinyl ester polymers. However, hydrocarbon based pour point depressants are known.

Polyalphaolefin (PAO) pour point depressants are described by Chong-Xiang Xiong in "The Structure and Activity of Polyalphaolefins as Pour Point Depressants", published in the Journal of the Society of Tribologists and Lubrication Engineers, March, 1993, pp 196–200. The PPD is prepared by polymerization of slack wax-derived $C_7$–$C_{20}$ alphaolefins using Ziegler-Natta catalyst. It is reported that PAO pour point depressant activity depends on average side chain length and on the distribution of the side chain length. Base oil characteristics influence the effectiveness of specific PAO pour point depressants.

It is also known that the low temperature flow properties of waxy distillate fuels can be improved by employing wax crystal modifiers as additives to fuels in a manner functionally similar to waxy lube PPD. The use of such additives to distillate fuels avoids the more costly step of deep dewaxing of the distillate feedstock.

One class of lubricants of particular interest in the present invention is synthetic lubricants obtained by the oligomerization of olefins, particularly $C_3$–$C_{20}$ alpha olefins. Catalytic oligomerization of olefins has been studied extensively. Known olefin oligomerization catalysts include the Ziegler-Natta type catalysts and promoted catalysts such as $BF_3$ or $AlCl_3$ catalysts. U.S. Pat. No. 4,613,712 for example, teaches the preparation of isotactic alpha-olefins in the presence of a Ziegler type catalyst. Other coordination catalysts, especially chromium on a silica support, are described in the art.

Recently, novel lubricant compositions (referred to herein as HVI-PAO and the HVI-PAO process) comprising poly-alphaolefins and methods for their preparation employing as catalyst reduced chromium on a silica support have been disclosed in U.S. Pat Nos. 4,827,064 and 4,827,023, incorporated herein by reference in their entirety. The process comprises contacting $C_6$–$C_{20}$ 1-alkene feedstock with reduced valence state chromium oxide catalyst on porous silica support under oligomerizing conditions in an oligomerization zone whereby high viscosity, high VI liquid hydrocarbon lubricant is produced having low methyl to methylene branch ratios of less than 0.19 and pour point below $-15°$ C. The process is distinctive in that little isomerization of the olefinic bond occurs compared to known oligomerization methods to produce polyalphaolefins using Lewis acid catalyst.

U.S. Pat. No. 5,146,021 to Jackson, et al. discloses lube compositions of HVI-PAO with mineral oil and polyolefins wherein oligomers from mixtures of $C_6$–$C_{20}$ alphaolefins are employed to provide high VI additives and shear stability. However, the patent does not claim or disclose the use of mixtures containing a high proportion of $C_{18}+$ alpha olefins to produce improved pour point depressants. U.S. Pat. No. 5,157,177 to Pelrine et al. discloses the oligomerization process relevant to the preparation of the foregoing HVI-PAO compositions. The compositions and process disclosed in these patents encompass polymer compositions that contain non-waxy components. The polymers are useful as lubricants with low pour point.

The object of the present invention is the production of novel lubricant additive hydrocarbon compositions that are highly effective as pour point depressants and/or combined pour point depressant and viscosity index improver (VII) produced by catalytic oligomerization of 1-alkenes.

Another object of the present invention is to provide an improved process for the production of pour point depressants by oligomerization of 1-alkenes using silica supported reduced chromium oxide catalyst.

Yet another object of the invention is to provide a pure hydrocarbon additive for distillate fuels that is effective in modifying wax crystal growth at low temperatures.

SUMMARY OF THE INVENTION

Hydrocarbon oligomers, and a process for their production, have been discovered that show superior properties as pour point depressants for mineral oil or synthetic oil. The oligomesr are also useful in modifying wax crystal formation at low temperature when added to distillate fuels. The oligomer is a near linear copolymer of a mixture of ethylene and $C_3$–$C_{22}$ 1-alkenes, or only 1-alkenes, wherein a large proportion of the pendant alkyl groups of the recurring 1-alkene monomer units contain between 12 and 22 carbon atoms, preferably between 14 and 18 carbon atoms. The linearity of the 1-alkene copolymer is distinguished by the relatively small amount of isomerization that occurs during copolymerization by the process disclosed in U.S. Pat Nos. 4,827,064 and 4,827,023 and evinced by a methyl to methylene branch ratio of less than 0.19 for oligomers formed from $C_6+$ 1-alkenes.

The superior pour point depressant properties of the compositions of the invention are preferably achieved by preparing oligomers from a feedstream mixture of ethylene and $C_3$–$C_{28}$ 1-alkenes, or only $C_3$–$C_{28}$ 1-alkenes, wherein the distribution of carbon numbers is bimodal instead of monomodal. Bimodal distribution in the present invention means that carbon number distribution in the total feedstream is skewed in such a manner as to exhibit two peaks, one peak of low carbon number and another peak of high carbon number. The bimodal feedstream produces the bimodal 1-alkene copolymers of the present invention comprising copolymers having a first maximum of pendant carbon chains with between one and 12 carbon atoms and a second maximum of pendant carbon chains with between twelve and twenty-four carbon atoms.

In comparison to pour point depressants known in the art, the novel hydrocarbon oligomers of the invention show a dramatic capability to reduce the low temperature pour point of mineral oils and synthetic oils when mixed with such liquids in quantities of less than 1 weight percent. When mixed with diesel fuels containing hydrocarbons that normally form wax crystals at low temperature, the oligomers of the invention modify the formation of wax crystals and minimize wax formation in the fuel.

As VI improvers, these novel hydrocarbon oligomers work as effectively as the single olefin based HVI-PAO's disclosed in U.S. Pat. No. 5,146,021. In addition, they add pour point depressant function to the VI improver. The novel oligomers of the invention are cited herein as mixed alpha-olefin HVI-PAO, or MHVI-PAO, to distinguish them over the HVI-PAO oligomers of the prior art.

The products of the invention are prepared by oligomerizing olefins, preferably a mixture of $C_6$–$C_{24}$ 1-alkenes containing at least 10 weight percent of $C_4$–$C_{24}$ 1-alkenes, preferably $C_{16}$–$C_{20}$ 1-alkenes, in contact with supported reduced valence state chromium oxide catalyst.

More particularly, a hydrocarbon lubricant additive has been discovered that is suitable as a pour point depressant. The additive comprises the copolymer residue of a mixture of 1-alkene comonomers selected from the group consisting of $C_3$–$C_{28}$ 1-alkenes. The copolymer contains at least 10 weight percent of $C_{14}$–$C_{24}$ 1-alkenes, but preferably 20 weight percent. It also has a number average molecular weight between 5,000 and 60,000; and a molecular weight distribution between 1 and 10.

The product of the invention is a near-linear liquid hydrocarbon copolymer useful in modifying the low temperature formation of wax particles in liquid hydrocarbon lubricants and fuels. The copolymer comprises poly(1-alkene) having a low methyl to methylene branch ratio and containing between 300 and 4500 carbon atoms, wherein recurring monomeric units of said copolymer comprise a mixture of ethylene and $C_3$–$C_{28}$ 1-alkene, or $C_3$–$C_{28}$ 1-alkenes, and at least 10 weight percent of the pendant chains of said copolymer contain between 12 and 22 carbon atoms, most preferred pendant chains are $C_{14}$ to $C_{18}$.

The product of the invention is prepared by contacting a mixture of olefin comonomers selected from the group consisting of ethylene and $C_3$–$C_{28}$ 1-alkenes with a reduced valence state Group VIB metal catalyst on a porous support under copolymerization conditions. The mixture contains at least 10 weight percent of $C_{14}$–$C_{24}$ 1-alkenes, preferably $C_{16}$–$C_{20}$ 1-alkenes. The product of the copolymerization is separated and a copolymer comprising the additive is recovered.

DETAILED DESCRIPTION OF THE INVENTION

Olefins useful as feedstock in the present invention include ethylene and $C_3$–$C_{28}$ 1-alkenes of odd and even carbon number. The preferred olefins are 1-alkenes, i.e., alpha-olefins selected from the group consisting of $C_6$–$C_{24}$ 1-alkenes. The preferred long chain 1-alkenes comprise $C_{14}$–$C_{24}$ α-olefins. The most preferred long chain 1-alkenes comprise $C_6$–$C_{20}$ α-olefins.

A feature inherent to the novelty of the instant invention is that the feedstock include a mixture of 1-alkenes and that the mixture of 1-alkenes comprise at least 10 weight percent $C_{16}$–$C_{24}$ 1-alkenes. The mixture may be a mixture of only two such 1-alkenes, for example, 1-hexene and 1-octadecene, 1-decene and 1-eicosene, or it may be a mixture that includes propylene, 1-butene, 1-pentene, 1-hexene, 1-heptene, 1-octene, 1-nonene, 1-decene, and higher 1-alkenes up to and including $C_{28}$ 1-alkene. In any event, at least 10 weight percent, but preferably 20 weight percent, of the 1-alkenes of the mixture will be 1-alkenes containing 16 to 24 carbon atoms.

The feedstock for the process of the invention can be acquired from a variety of processes and process streams common to modern petroleum refining operations. The products of slack wax cracking, ethylene growth reaction and Fischer-Tropsch alpha olefin process are useful sources of mixed 1-alkenes. These and other sources of feed-stock may contain alkanes and internal olefins. As a result, the 1-alkene feedstream to the process of the invention itself may contain these alkanes and internal olefins. However, these are not reactive in the oligomerization reaction of the invention.

The oligomerization reactions of the invention are catalyzed by supported metal oxide catalysts, such as Cr compounds on silica or other supported IUPAC Periodic Table Group VIB compounds as described in U.S. Pat. 4,827,064 to M. Wu. The catalyst most preferred is a lower valence Group VIB metal oxide on an inert support. Preferred supports include silica, alumina, titania, silica alumina, magnesia and the like. The support material binds the metal oxide catalyst. These pourous supports may be in powder form or in extrudate form. Those porous substrates having a pore opening of at least 40 angstroms are preferred.

The support material usually has high surface area and large pore volumes with average pore size of 40 to about 350 angstroms. The high surface area are beneficial for supporting a large amount of highly dispersive, active chromium metal centers and to give maximum efficiency of metal usage, resulting in very high activity catalyst. The support should have large average pore openings of at least 40 angstroms, with an average pore opening of >60 to 300 angstroms preferred. For this catalyst to be used in fixed bed or slurry reactor and to be recycled and regenerated many times, a silica support with good physical strength is preferred to prevent catalyst particle attrition or disintegration during handling or reaction.

The supported metal oxide catalysts are preferably prepared by impregnating metal salts in water or organic solvents onto the support. Any suitable organic solvent known to the art may be used, for example, ethanol, methanol, or acetic acid. The solid catalyst precursor is then dried and calcined at 200° to 900° C. by air or other oxygen-containing gas. Thereafter the catalyst is reduced by any of several various and well known reducing agents such as, for example, CO, $H_2$, $NH_3$, $H_2S$, $CS_2$, $CH_3SCH_3$, $CH_3SSCH_3$, metal alkyl containing compounds such as $R_3Al$, $R_3B$, $R_2Mg$, RLi, $R_2Zn$, where R is alkyl, alkoxy, aryl and the like. Preferred are CO or $H_2$, CO or $H_2$ containing gas or metal alkyl containing compounds.

Alternatively, the Group VIB metal may be applied to the substrate in reduced form, such as CrII compounds. The catalyst can be used in a batch type reactor or in a fixed bed, continuous-flow reactor.

In general the support material may be added to a solution of the metal compounds, e.g., acetates or nitrates, etc., and the mixture is then mixed and dried at room temperature. The dry solid gel is purged at successively higher temperatures to about 600° for a period of about 16 to 20 hours. Thereafter the catalyst is cooled down under an inert atmosphere to a temperature of about 250° to 450° C. and a stream of pure reducing agent is contacted therewith for a period when enough CO has passed through to reduce the catalyst as indicated by a distinct color change from bright orange to pale blue. Typically, the catalyst is treated with an amount of CO equivalent to a two-fold stoichiometric excess to reduce the catalyst to a lower valence CrII state. Finally the catalyst is cooled down to room temperature and is ready for use.

Example 1 specifically illustrates the method for preparation of the catalyst employed in the present invention and disclosed in U.S. Pat. No. 4,827,064.

EXAMPLE 1

Catalyst Preparation and Activation Procedure 1.9 grams of chromium (II) acetate ($Cr_2(OCOCH_3)_4 2H_2O$)(5.58 mmole) (commercially obtained) is dissolved in 50 cc of hot acetic acid. Then 50 grams of a silica gel of 8-12 mesh size, a surface area of 300 $m^2/g$, and a pore volume of 1 cc/g, also is added. Most of the solution is absorbed by the silica gel. The final mixture is mixed for half an hour on a rotavap at room temperature and dried in an open-dish at room temperature. First, the dry solid (20 g) is purged with $N_2$ at 250° C. in a tube furnace. The furnace temperature is then raised to 400° C. for 2 hours. The temperature is then set at 600° C. with dry air purging for 16 hours. At this time the catalyst is cooled down under $N_2$ to a temperature of 300° C. Then a stream of pure CO (99.99% from Matheson) is introduced for one hour. Finally, the catalyst is cooled down to room temperature under $N_2$ and is ready for use.

While providing oligomers having a very low branch ratio, the oligomerization of 1-alkenes with reduced chromium oxide catalyst on silica support also provides a highly uniform structural composition, particularly when compared to conventional polyalphaolefins produced by $BF_3$, $AlCl_3$ or Ziegler-type catalysis. HVI-PAO oligomers have been shown to have a very uniform linear side chain branch and contain regular head-to-tail connections. The oligomers are essentially linear. In addition to the structures from the regular head-to-tail connections, the backbone structures have some head-to-head connections.

It has been discovered that activated reduced chromium catalyst on $SiO_2$ support efficiently produces polymers with the right molecular weight range and chemical composition to form useful additives from wide mixtures of alphaolefins. The mixed olefin based HVI-PAO polymers show a very large pour point depressant effect when blended with wax containing lubricant basestocks. This result is evident while the mixed olefin based polymers also are effective as viscosity index improvers (VII). The mixed olefin based HVI-PAO produced from reduced chromium catalyst on $SiO_2$ support can also minimize wax formation when blended with diesel fuel. Thus, it can be used to improve the flow properties of waxy fuels at low temperature. Since HVI-PAO polymers are pure hydrocarbons they will have better thermal stability, oxidative stability and solubility in hydrocarbon lubricants and distillate fuels then commercial pour point depressants or wax crystallization modifiers. These commercial additives are mostly polymethacrylates or ethylene-vinyl ester copolymers.

Examples of specific lubricant base stocks for which the polymers of the invention are effective as pour point depressants are summarized as follows and their physical properties are presented in Table 1:

LN142-100", solvent neutral mineral base stock, available from Mobil Oil Corp. as product number 71326-3, produced by methyl ethyl ketone solvent dewaxing;

LN321-150", solvent neutral mineral base stock, produced by catalytic dewaxing;

HN339-700", heavy neutral mineral base stock, produced by catalytic dewaxing;

BS345—bright stock mineral oil, produced by catalytic dewaxing;

WHI-A, WHI-B stocks—derived from slack wax. The wax is hydroisomerized at high pressure, such as 1500-3000 psi over an amorphous catalyst or zeolite.

PAO-1, a 2 cS synthetic hydrocarbon poly-alpha-olefin fluid available from Mobil Chemical.

PAO-2, a 5.5 cS synthetic hydrocarbon poly-alpha-olefin fluid available from Mobil Chemical.

TABLE 1

| | Base Stock Properties | | | | |
|---|---|---|---|---|---|
| | | Viscosity, cS | | | Pour |
| Stock No. | Stock Type | 100° C. | 40° C. | VI | Point °C. |
| LN142 | mineral, solvent dewax | 4.19 | 21.23 | 97 | −14 |
| LN321 | mineral catalytic dewax | 4.61 | 24.1 | 106 | −3 |
| HN339 | mineral catalytic dewax | 13.08 | 138.53 | 86 | −12 |
| BS345 | mineral catalytic dewax | 30.2 | 460.62 | 94 | 4 |
| WHI-A | wax-isomerized, solvent dewax | 5.35 | 26.1 | 144 | −16 |
| WHI-B | wax-isomerized, solvent dewax | 5.14 | 24.16 | 148 | −15 |

As noted, the products of the invention are useful in modifying wax formation in distillate fuels. Generally, distillate fuels include jet fuels, diesel fuels and heating oils. The compositions of the present invention are particularly useful in automotive and railroad diesel fuels.

The process and compositions of the present invention are described by illustrating their preparation and properties in the following Examples 2-11. The Examples include the method for the preparation of the novel polymers of the invention (Example 2) and the properties of blends of the novel polymers with various lubricant basestock (Examples 3-10) and with diesel fuel (Example 11). The catalyst used in the oligomerization of the mixed 1-alkene monomers is prepared according to the method described in Example 1. The results are shown in Table 2 for the preparation of the copolymer of the invention and Table 3 shows the properties of blends prepared from the copolymer with mineral oil and synthetic lubricants (Examples 2-9).

EXAMPLE 2

Six grams of $Cr/SiO_2$ catalyst prepared as described in Example 1 were mixed with an alpha olefin mixture containing six to twenty carbon numbers and the mixture was stirred at room temperature for twenty-four hours. The alpha olefin mixture has a composition comparable to the alpha olefin mixture produced from a single stage ethylene growth reaction and is reported in Table 2. Gas chromatograph (GC) analysis of the polymer solution produced from the oligomerization reaction of alphaolefins showed that 70% to 90% of the alpha olefins were converted into polymers. The slurry mixture was very thick and 400 cc of xylene was added to dilute and quench the catalyst. The mixed olefin based HVI-PAO polymer was isolated by filtration to remove the catalyst, followed by distillation at 160° C. and 100 millitorr to remove solvent and any unreacted olefins. As shown in Table 2, the polymer composition contained different amounts of alphaolefins. All of the alphaolefins in the starting mixture were converted into polymer. The residual olefins were internal or branched olefins present in the starting mixture. This polymer had a number average molecular weight of 18,200, weight average molecular weight of 58,000 and molecular weight distribution of 3.19.

EXAMPLE 3

The sample prepared in Example 2 was blended with a light neutral paraffinic mineral base stock, LN321, which was dewaxed using a catalytic dewaxing process. The properties of the base stock and the blends are summarized in Table 3. These data show that the blend containing 0.26 weight percent of the product of Example 2 has a pour point of −38° C. and cloud point of 3.0° C., a 35° C. pour point reduction and 2.6° C. cloud point reduction compared to the starting base stock LN321. also the blend had higher VI than the base stock, i.e., 111 versus 106 for the base stock.

TABLE 2

Composition of Starting Olefin Mixtures and Polymers

| Carbon Number | Olefin MW | Wt % in Mix. | Wt % after 24 hrs | Conversion % | % Olefin in Polymer |
|---|---|---|---|---|---|
| 6 | 84 | 6.8 | 1.9 | 72 | 6 |
| 8 | 112 | 9.4 | 0.8 | 91 | 11 |

TABLE 2-continued

Composition of Starting Olefin Mixtures and Polymers

| Carbon Number | Olefin MW | Wt % in Mix. | Wt % after 24 hrs | Conversion % | % Olefin in Polymer |
|---|---|---|---|---|---|
| 10 | 140 | 13.3 | 1.2 | 91 | 15 |
| 12 | 168 | 11.1 | 1.1 | 90 | 12 |
| 14 | 196 | 11.8 | 3.1 | 74 | 11 |
| 15 | 210 | 7.5 | 1.7 | 77 | 7 |
| 16 | 224 | 7.6 | 1.2 | 84 | 8 |
| 18 | 252 | 6.2 | 1.6 | 74 | 6 |
| 20 | 280 | 25.6 | 6.8 | 73 | 23 |
| 20+ | 282 | 0.7 | 0.4 | 43 | 0 |
| Polymer | — | 0 | 80 | — | — |

EXAMPLE 4

The same base stock used in Example 3 was blended with a commercial VI improver, Acryloid 956 (Example 4A), or commercial pour point depressant Acryloid 156 (Example 4C, and NALCO 5644 (Example 4B). The pour points of the blends were decreased only 2° to 26° C. and the cloud points remained the same as the base stock as shown in Table 3.

EXAMPLE 5

The product of Example 2 was blended with a mineral oil (LN142) which was prepared using a conventional solvent dewaxing process. The properties of the base stock and blends are summarized in Table 3. These data show that the blend containing 0.49 weight percent of the product of Example 2 had a pour point of −37° C. and cloud point of −12.9° C. This corresponds to a 23° C. pour point reduction and 3.5° C. cloud point reduction compared to the starting base stock. Also, the blend has higher VI than the base stock, 109 versus 97 for the stock.

EXAMPLE 6

A blend was prepared as described in Example 3, except the base stock was a heavy neutral mineral basestock HN339. The pour point of HN339 was depressed from −12° C. to −27° when 0.26 weight percent of the product of Example 2 was blended.

EXAMPLE 7

A blend was prepared as described in Example 3, except the base stock was mineral bright stock BS345. The pour point of BS 345 was depressed from +4° C. to −12° C. when 0.55 weight percent of the product of Example 2 was added.

EXAMPLE 8

A blend was prepared as described in Example 3, except the base stock was prepared from a wax hydroisomerization process. In this case, the pour point was depressed from −15° C. to −23° C.

TABLE 3

| Example No. | Base oil Type | VII/PPD type | Wt % VII/PPD | Pour point, °C. | V@40° C., cS | V@100° C., cS | VI | Cloud Point °C. |
|---|---|---|---|---|---|---|---|---|
| No. 3 | LN321 | none | 0 | −3 | 24.1 | 4.61 | 106 | 5.6 |
| " | " | Exam.2 | 0.26 | −38 | 24.81 | 4.74 | 111 | |
| " | " | " | 0.58 | −28 | 25.87 | 4.94 | 116 | 1.5 |
| No. 4 comparative | | | | | | | | |
| 4A | " | Acryloid 956 | 0.25 | −5 | 24.47 | 4.71 | 111 | 6.2 |
| 4B | " | Nalco-5644 | 0.26 | −26 | 24.15 | 4.63 | 107 | na |
| 4C | " | Acryloid 156 | 0.24 | −29 | 24.38 | 4.71 | 112 | na |
| No. 5 | LN142 | none | 0 | −14 | 21.32 | 4.19 | 97 | |
| " | " | Exam. 2 | 0.49 | −37 | 22.28 | 4.43 | 109 | −12.9 |
| " | " | " | 1.05 | −32 | 23.94 | 4.71 | 115 | −14.0 |
| No. 6 | HN339 | none | 0 | −12 | 138.53 | 13.08 | 86 | na |
| " | " | Exam. 2 | 0.26 | −27 | 140.53 | 13.45 | 89 | na |
| " | " | " | 0.5 | −29 | 143.35 | 13.68 | 90 | na |
| No. 7 | BS345 | none | 0 | 4 | 460.62 | 30.2 | 94 | na |
| " | " | Exam. 2 | 0.55 | −12 | 468.05 | 30.78 | 95 | na |
| " | " | " | 1.09 | −14 | 486.05 | 32.91 | 100 | na |
| No. 8 | WHI-A | none | 0 | −16 | 26.1 | 5.35 | 144 | 14.7 |
| " | " | Exam. 2 | 0.65 | −20 | 29.21 | 5.78 | 144 | −14.2 |
| " | " | " | 1.31 | −18 | 30.22 | 6.13 | 157 | −14.8 |
| No. 9 | PAO-1 | none | 0 | −66 | 5.2 | 1.7 | 90 | na |
| " | " | Exam. 2 | 0.51 | −78 | 5.47 | 1.82 | 106 | na |
| " | " | " | 1.73 | −69 | 6.39 | 2.13 | 144 | na |
| No. 10 | PAO-2 | none | 0 | −62 | 30.5 | 5.5 | 135 | na |
| " | " | Exam. 2 | 0.45 | −71 | 30.95 | 5.95 | 141 | na |
| " | " | " | 1 | −64 | 32.68 | 6.22 | 142 | na |

EXAMPLE 9

A blend was prepared as described in Example 3, except the base stock was a low viscosity polyalphaolefin product of 1.7 cS. A 12° C. pour point reduction was observed.

EXAMPLE 10

A blend was prepared as described in Example 3, except the base stock was a synthetic PAO base stock of 5.6 cS (stock 509). The pour point reduction was 9° C.

EXAMPLE 11

A series of blends was prepared using a Coryton diesel fuel having a pour point of −13.3° C. and a cloud point of −2.9° C. and the HVI-PAO product of Example 2. Pour points and cloud points were measured on the blends of these mixed HVI-PAO oligomers with the diesel fuel and the results are presented in Table 4. It was found that the mixed HVI-PAO is at least comparable to commercial fuel pour point depressants. However, the mixed HVI-PAO had extra cloud point depression which is not observed with the commercial pour point depressants.

TABLE 4

| HVI-PAO ppm | Pour Point °C. | Cloud Point °C. | ΔPP | ΔCP |
|---|---|---|---|---|
| 100 | −31 | −6.3 | 17.7 | 3.4 |
| 200 | −26.5 | −5.8 | 13.2 | 2.9 |
| 500 | −28.7 | −6.8 | 15.4 | 3.9 |

EXAMPLE 12

A two component HVI-PAO was prepared according to the general procedure described in Example 2. The components were 1-decene and 1-octadecene. Oligomers were prepared from feeds containing 7% 1-octadecene, 25% 1-octadecene and 40% 1-octadecene. When blends were prepared of mineral oil (LN321) containing the HVI-PAO oligomers, the corresponding pour point depression was −30° C. for 40% 1-octadecene, −13° C. for 25% 1-octadecene and −7° C. for 7% 1-octadecene.

The amount of pour point depression depends on the concentration of mixed HVI-PAO in the blend. The optimum concentration for the largest pour point depression is about 0.1 weight percent to about 0.4 weight percent. Usually the best results are achieved using 0.20–0.30 weight percent, preferably 0.25 weight percent. Above or below this concentration the amount of depression decreases. However, even at low concentrations in the range of 50–100 ppm a 5°–12° C. pour point depression is observed.

The HVI-PAO oligomers effective as pour point depressants in the present invention comprise copolymers of $C_3$–$C_{28}$ 1-alkenes. The copolymer contains at least 10 weight percent of $C_{14}$–$C_{24}$ 1-alkenes; has a number average molecular weight between 5,000 and 60,000; a molecular weight distribution between 1 and 10.

An important part of the novelty of the present invention resides in the discovery that the copolymerization of certain mixtures of α-olefins according to the process of the invention leads to oligomers of unique structure (MHVI-PAO) with unexpectedly superior properties as pour point depressants and, even more notable, combined pour point depressants and viscosity index improves. The novel oligomers are produced from mixed α-olefin feedstock having a bimodal distribution of carbon numbers for the α-olefins. The distribution is such that the carbon numbers reach one maximum at a relatively high carbon number and another or second maximum at a relatively low carbon number. The preferred oligomers of the invention are characterized by exhibiting both maxima. This bimodal feedstream leads to the formation of oligomers of the present invention comprising copolymers having a first maximum of pendant carbon chains with between one and twelve carbon atoms and a second maximum of pendant carbon chains with between twelve and twenty-four carbon atoms. In terms of 1-alkene content, the oligomer or coploymer residue contains recurring units comprising a bimodal distribution of 1-alkenes having a first maximum between $C_3$ and $C_{14}$ 1-alkenes and a second maximum between $C_{14}$ and $C_{26}$ 1-alkenes.

Figure 1:
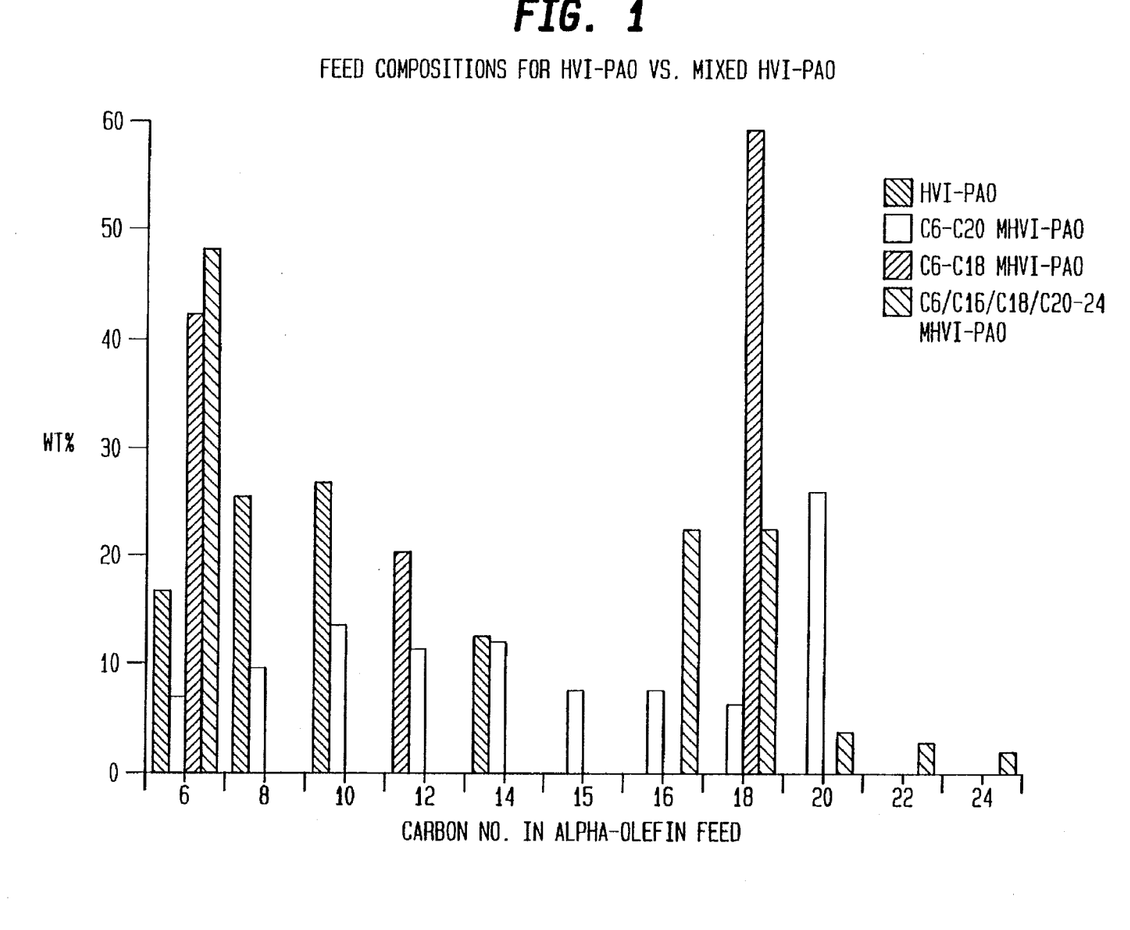
FIG. 1 is a graphical representation comparing the feed composition of HVI-PAO versus the novel MHVI-PAO oligomers of the invention.
Figure 2:
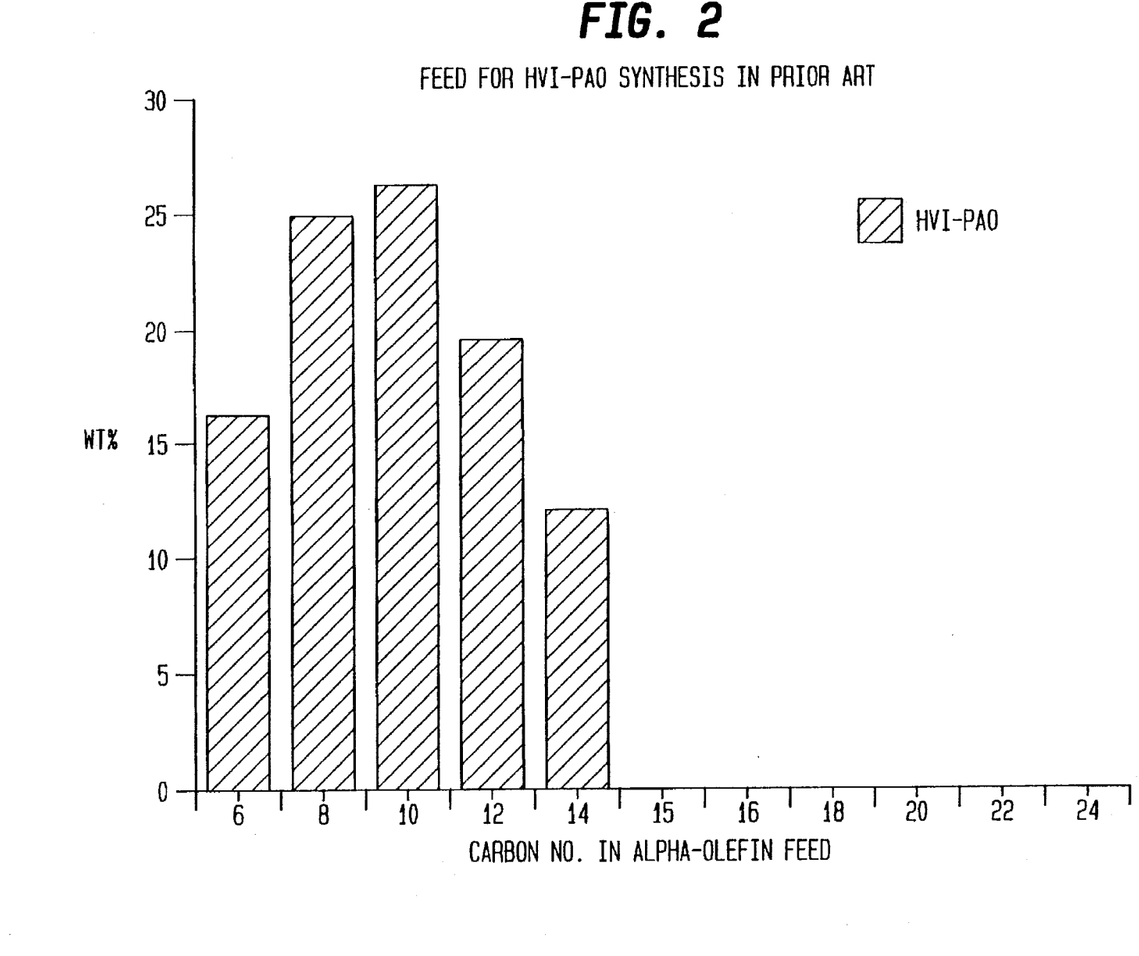
FIG. 2 is a graphical representation of the feed composition of HVI-PAO of the prior art.
Figure 3:
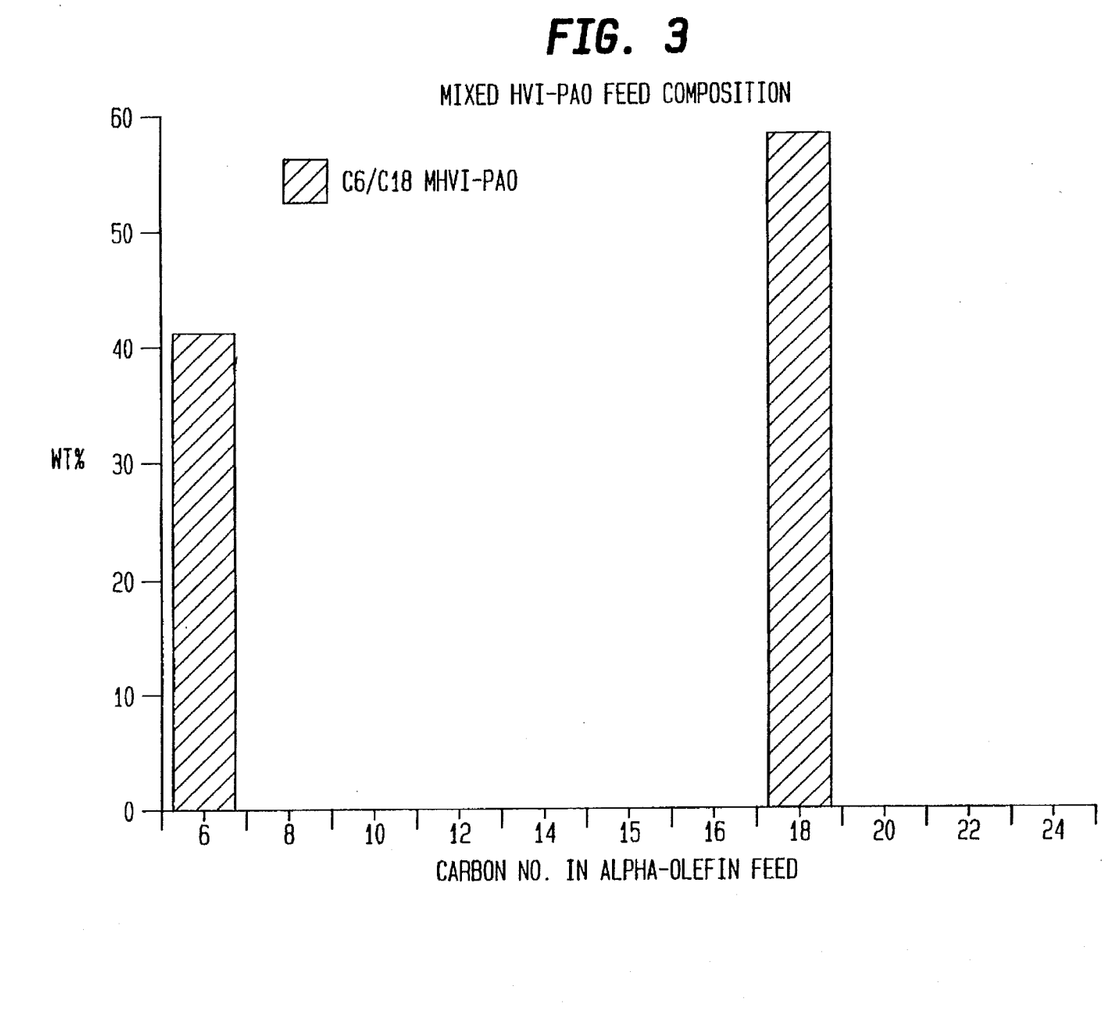
FIG. 3 is a graphical representation of the feed composition of one preferred embodiment of MHVI-PAO of the invention.
Figure 4:
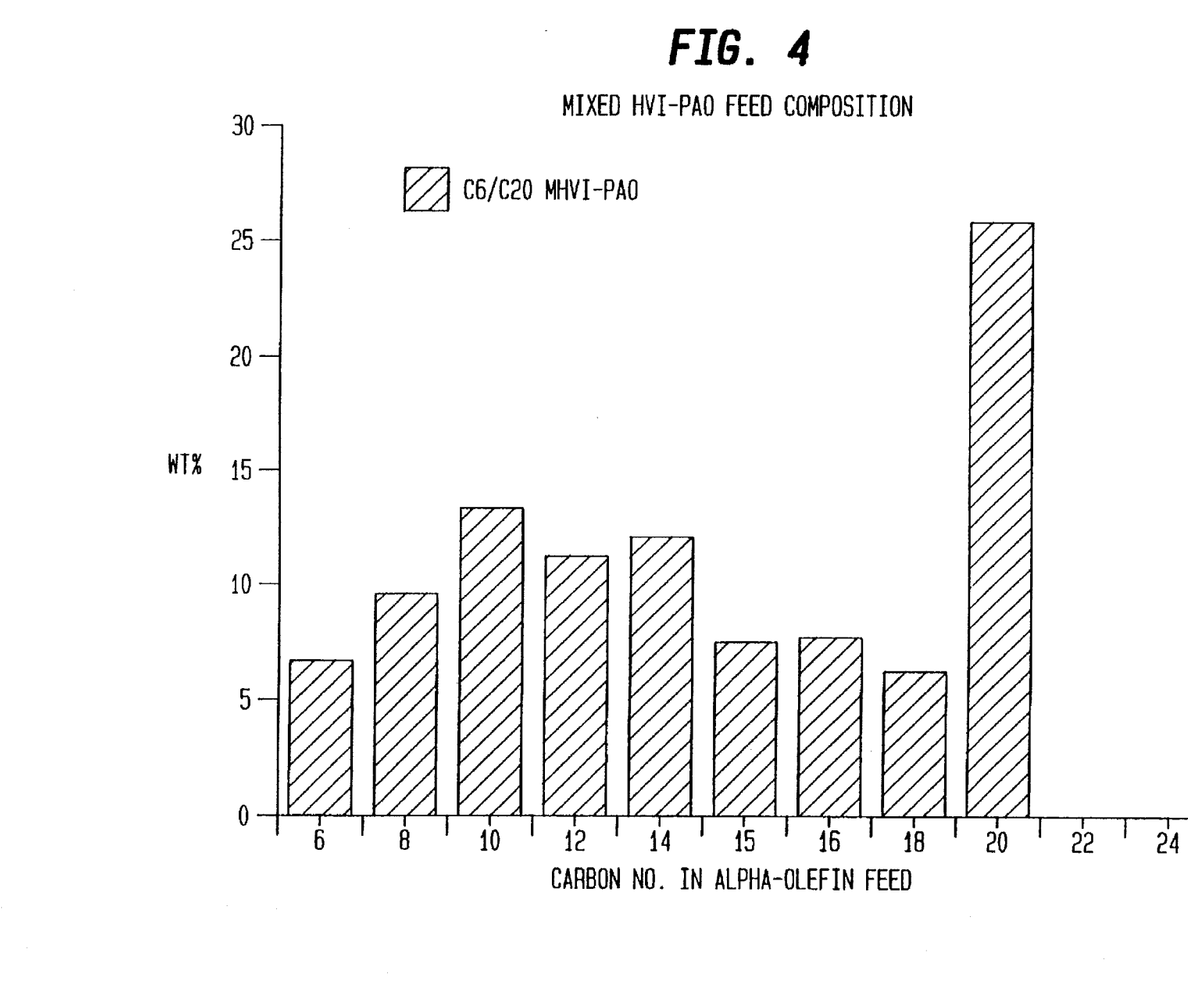
FIG. 4 is a graphical representation of the feed composition of another preferred embodiment of MHVI-PAO of the invention.
Figure 5:
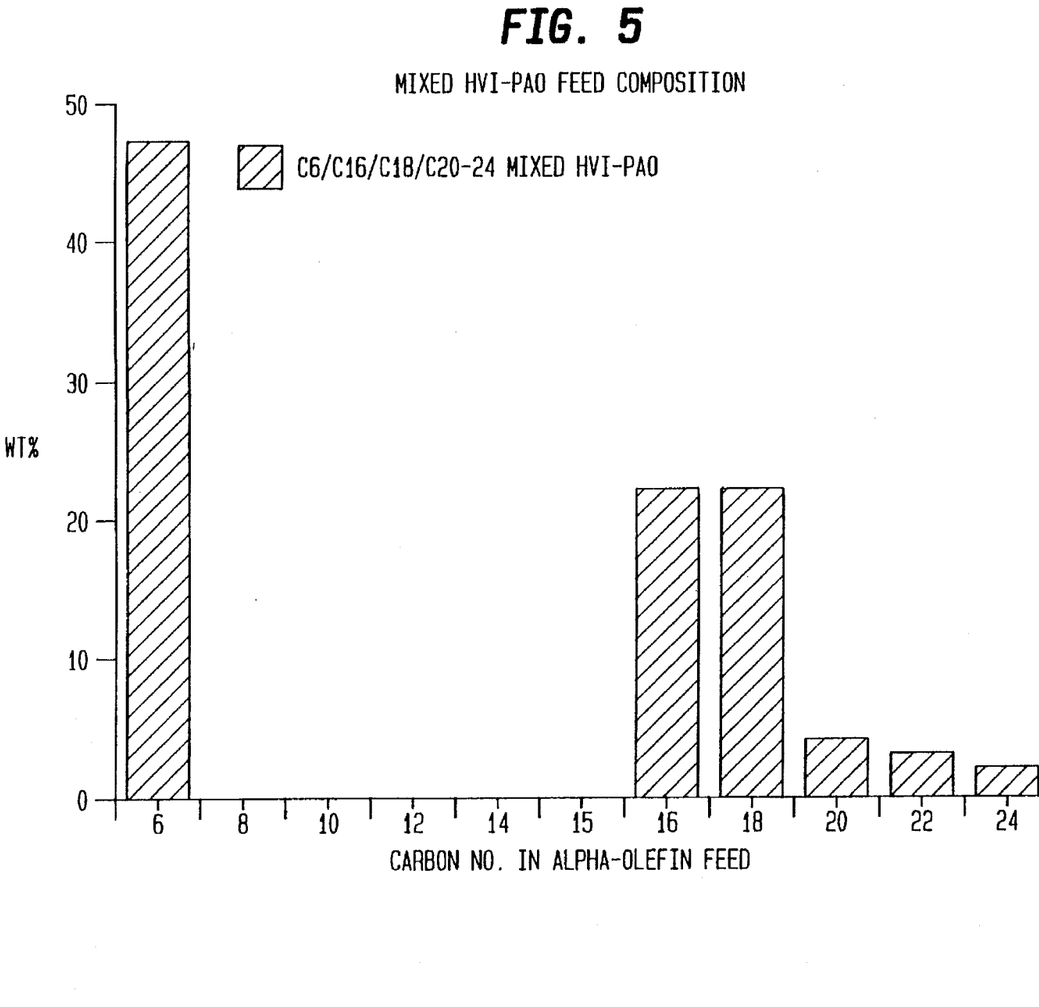
FIG. 5 is a graphical representation of the feed composition of yet another preferred embodiment of MHVI-PAO of the invention.

Referring to FIG. 1, a graphical representation is presented comparing the feed composition of HVI-PAO versus the novel MHVI-PAO oligomers of the invention. The graph shows that the prior art HVI-PAO oligomers employ monomodal feed mixtures having a single maximum of relatively low α-olefin carbon number. Feeds for other MHVI-PAO oligomers of the invention are also presented as bimodal. The distinction is emphasized by referring to FIG. 2 which shows the monomodal feed composition used for prior art HVI-PAO synthesis. FIGS. 3–5 illustrate MHVI-PAO feed compositions for particularly preferred oligomers of the invention prepared from two or more α-olefins. Regardless of the mix, FIGS. 3–5 show the uniquely bimodal distribution of olefins in the MHVI-PAO feedstream with one maximum of six to ten carbon atoms and a second maximum falling between sixteen and twenty carbon atoms. Notably, the required bimodal character of the feed does not preclude a continuum in α-olefin carbon numbers in the feed. This is illustrated in FIG. 4.

As noted herein before, liquid hydrocarbon polymers and copolymers of alpha olefins (HVI-PAO) have been prepared by reduced chromium oxide oligomerization as disclosed particularly in U.S. Pat. No. 4,827,064 to M. Wu. These lubricant range oligomers exhibit unexpectedly high viscosity indices and low pour points. While these polymers are compositionally different than the polymers of the present invention, their similarity is sufficient to provide a basis to conjecture that the (HVI-PAO) compositions of U.S. Pat. No. 4,827,064 would also be effective pour points depressants. Accordingly, a series of experiments were carried out (Examples 13–16) to compare the pour point depressant properties of the HVI-PAO compositions of U.S. Pat. No. 4,827,064 with the products of the instant invention.

In Examples 13–16, using 1-decene or $C_6$–$C_{14}$ alpha olefins, HVI-PAO oligomers were prepared according to the above cited patent and the polymer or copolymer product blended with Stock 142 mineral oil. The results of these experiments are presented in Table 5. The results show that the HVI-PAO containing no $C_{16}$ or higher α-olefins produced no pour point depressant effect with Stock 142 mineral oil. Consequently, the products of the present invention are distinguished over those of other HVI-PAO patents such as U.S. Pat. No. 4,827,064.

TABLE 5

| | | Blend Properties | | | |
|---|---|---|---|---|---|
| Example | HVI-PAO | V@100° C. cS | V@40° C. cS | VI | Pour Point °C. |
| LN142 | mineral oil | 4.03 | 20.02 | 97 | −14 |
| Exam. 13 | 3300 cS 1-decene HVI-PAO | 4.15 | 20.49 | 103 | −16 |
| Exam. 14 | $C_6$–$C_{14}$ α-olefins | | | | −16 |
| Exam. 15 | 1-decene & 4-methyl-1-pentene | | | | −15 |
| Exam. 16 | 57 cS HVI-PAO from 70/30 $C_{10}$/$C_{20–24}$ | 4.06 | 20.09 | 100 | −14° C. |

A key discovery of the present invention is the fact that the products of the invention, in order to demonstrate a large pour point depressant effect must contain a relatively high proportion of higher carbon number alpha olefins. Optimally, the feed to the oligomerization process should contain a relatively higher proportion of alpha olefins having a carbon number of $C_{16}$–$C_{20}$. In this case, the addition of a small quantity of the copolymer of the invention to a lubricant base stock will provide a significant reduction in pour point. Surprisingly, the additive of the invention, besides contributing pour point lowering of the lubricant fluid, also act as a viscosity index improver (VII) and increases the viscosity index of the lubricant. This effect is achieved simultaneously, i.e., pore point is depressed while viscosity index of the lubricant is increased. Therefore, the products of the invention act as an additive which both reduces a lubricant base stock pour point (PPD) and increases viscosity index (VII).

The following examples 17–22 are presented to illustrate the qualities of the product of the invention to lower pour point and to increase viscosity index. Examples 17–20 are presented to specifically illustrate the effect of various copolymer compositions containing a relatively high proportion of higher carbon number alpha olefins in the feed. Examples 21–22 present the results of experiments showing the ability of the products of the invention to simultaneously reduce pore point and increase viscosity index.

EXAMPLE 17

A copolymer of Mn (number average molecular weight) 8.845 and MWD (molecular weight distribution) 3.34 was prepared by reacting an α-olefin mixture containing 1-hexene, 1-hexadecene, 1-octadecene and 1-eicosene (46 wt %, 20 wt % and 20%, respectively) over an activated Cr/SiO$_2$ catalyst. When 0.20 wt % of this polymer was blended with LN142 lubricant base stock, the pour point of the base oil was depressed from −14° C. down to −38° C. This example demonstrated that $C_{16}$–$C_{20}$ α-olefins are necessary components for good PPD effect.

EXAMPLE 18

A copolymer was prepared as described in Example 17, except the starting olefins contain 1-hexene and 1-octadecene (50 wt % and 50%, respectively). When 0.27 wt % of this polymer, with Mn 11,890 and MWD 5.8, was blended with LN142, the pour point was depressed from −14° C. down to −36° C.

EXAMPLE 19

A copolymer was prepared by the process of the invention with Mn of 28,630 and MWD of 3.97 from an alpha-olefin mixture containing 70% 1-decene and 30% Gulftene $C_{20-24}$ α-olefins. When 0.24% of this polymer was blended with LN142 base stock, the pour point decreased from −14° C. to −36° C.

EXAMPLE 20

A copolymer with Mn 35,220 and MWD 4.32 was prepared from an alpha-olefin mixture containing 50% 1-decene, 25% $C_{20-24}$ α-olefins (Gulftene 20-24) and 25% $C_{24-28}$ α-olefins (Gulftene 24-28). When 0.22% of this polymer was blended with LN142 base stock the pour point was depressed to −22° C. from −14° C.

EXAMPLE 21

A mixed HVI-PAO copolymer of the invention was prepared from a mixture containing 60% 1-decene and 40%

1-octadecene to provide a copolymer having a number averaged MW of 30,100 and MWD (molecular weight distribution) of 9.02. The copolymer so formed was blended with a 150 sus mineral oil, LN 321, and demonstrates that the mixed HVI-PAO copolymer can function as both a VI improver and a pour point depressant when higher concentrations of the mixed HVI-PAO copolymer are blended with a mineral oil basestock. The results are summarized in the following Table 6. The results show that when up to 1 weight % mixed HVI-PAO copolymer of the invention was blended with the mineral oil both the VI and the pour point improved significantly.

EXAMPLE 22

An experiment was carried out similar to Example 21 except the mixed HVI-PAO copolymer was prepared from a mixture of 50% C6 and 50% C18 α-olefins and had a Mn of 11,900 and MWD of 5.8. The base oil used in Example 22 is a 100" mineral oil stock 142. The results are presented in Table 7. As in the previous Example 21, this example demonstrates that the mixed HVI-PAO copolymer of the invention improves the pour point and VI of the base stock simultaneously.

TABLE 6

Mixed HVI-PAO and Stock LN321 (Example 21)

| Wt % HVI-PAO | V@100° C. cS | VI | °C. Pour Point | ΔVI | Δpour point |
|---|---|---|---|---|---|
| 0 | 4.61 | 106 | −3 | — | — |
| 0.25 | 5.19 | 114 | −30 | 8 | 27 |
| 0.48 | 5.19 | 118 | −37 | 15 | 34 |
| 1.18 | 5.98 | 133 | −39 | 27 | 36 |

TABLE 7

Mixed HVI-PAO and LN142 (Example 22)

| Wt % HVI-PAO | V@100° C. cS | VI | °C. Pour Point | ΔVI | Δpour point |
|---|---|---|---|---|---|
| 0 | 4.03 | 97 | −14 | — | — |
| 0.27 | 4.18 | 97 | −36 | 0 | 22 |
| 0.67 | 4.46 | 111 | −38 | 14 | 24 |
| 1.08 | 4.74 | 121 | −38 | 24 | 24 |

Specifically preferred mixtures of 1-alkene monomers useful as feedstream for the present invention include: $C_6$, $C_8$, $C_{10}$, $C_{12}$, $C_{14}$, $C_{15}$, $C_{16}$, $C_{18}$ and $C_{20}$ 1-alkenes; $C_6$ and $C_{18}$ 1-alkenes; $C_{10}$ and $C_{20-24}$ 1-alkenes; $C_{10}$ and $C_{20-28}$ 1-alkenes; $C_6$, $C_{16}$, $C_{18}$ and $C_{20}$ 1-alkenes, and $C_{10}$ and $C_{18}$ 1-alkenes.

What is claimed is:

1. A process for the production of a hydrocarbon lubricant additive suitable as a pour point depressant and viscosity index improver comprising contacting a mixture of olefin comonomers selected from the group consisting of ethylene and $C_3$–$C_{28}$ 1-alkenes with a reduced valence state Group VIB metal catalyst on a porous support under copolymerization conditions, said mixture comprising a bimodal distribution of 1-alkenes having a first maximum between $C_3$ and $C_{14}$ 1-alkenes and a second maximum between $C_{14}$ and $C_{26}$ 1-alkenes; and separating a copolymer comprising said additive.

2. The process of claim 1 wherein said mixture is selected from $C_6$–$C_{24}$ 1-alkenes.

3. The process of claim 1 wherein said catalyst comprises reduced $CrO_3$ and said support comprises silica having a pore size of at least 40 Angstroms.

4. The process of claim 1 wherein said copolymerization conditions comprise temperature between 25° C. and 150° C.

5. The process of claim 4 wherein said temperature is between 25° C. and 95° C.

6. A liquid fuel mixture comprising diesel fuel and the copolymer a near-linear liquid hydrocarbon copolymer which is effective to inhibit the low temperature formation of wax particles in liquid hydrocarbon lubricants and fuels, said copolymer comprising poly(1-alkene) and containing between 300 and 4500 carbon atoms wherein said copolymer residue contains a bimodal distribution of said 1-alkenes comprising a first maximum between $C_3$ and $C_{14}$ 1-alkenes and a second maximum between $C_{14}$ and $C_{26}$ 1-alkenes, and wherein recurring monomeric units of said copolymer comprise a mixture olefins selected from ethylene and $C_3$–$C_{28}$ 1-alkenes where at least 10 weight percent of the pendant chains of said copolymer contain between 12 and 22 carbon atoms.

7. A hydrocarbon fuel composition containing a hydrocarbon fuel additive suitable as a pour point depressant, said additive comprising the copolymer residue of a mixture of 1-alkene comonomers selected from $C_3$–$C_{28}$ 1-alkenes, wherein said copolymer contains at least 10 weight percent of recurring monomeric units of $C_4$–$C_{24}$ 1-alkenes; has a number average molecular weight between 5,000 and 60,000; a molecular weight distribution between 1 and 10 and a bimodal distribution of said 1-alkenes comprising a first maximum between $C_3$ and $C_{14}$ 1-alkenes and a second maximum between $C_{14}$ and $C_{26}$ 1-alkenes.

8. The composition of claim 2 wherein said coplymer residue contains a bimodal distribution of said 1-alkenes comprising a first maximum between $C_3$ and $C_{14}$ 1-alkenes and a second maximum between $C_{14}$ and $C_{26}$ 1-alkenes.

9. The composition of claim 7 wherein said mixture of 1-alkenes comprises a bimodal mixture of $C_6$–$C_{24}$ 1-alkenes.

10. The composition of claim 7 comprising the copolymer of 1-decene or 1-hexane and 1-octadecene.

11. The composition of claim 10 wherein the mole ratio of 1-decene or I-hexane to 1-octadecene is about 3 to 2.

12. The composition of claim 7 in which the copolymer residue comprises a near-linear liquid hydrocarbon copolymer effective to inhibit the low temperature formation of wax particles in the fuels, said copolymer comprising poly (1-alkene) and containing between 300 and 4500 carbon atoms, wherein recurring monomeric units of said copolymer comprise a mixture olefins selected from ethylene and $C_3$–$C_{28}$ 1-alkenes where at least 10 weight percent of the pendant chains of said copolymer contain between 12 and 22 carbon atoms.

13. The composition of claim 12 wherein said recurring units comprise a mixture of $C_6$–$C_{24}$ 1-alkenes.

14. The composition of claim 12 comprising the copolymer of 1-decene or 1-hexane and 1-octadecene.

15. The composition of claim 12 wherein said fuel comprises diesel fuel.

16. The composition of claim 12 containing between 0.01 and 1.0 weight percent of said pour point depressant.

* * * * *